(12) United States Patent
Lu et al.

(10) Patent No.: US 8,129,938 B2
(45) Date of Patent: Mar. 6, 2012

(54) MULTI POWER SUPPLY SYSTEM FOR A PORTABLE DEVICE

(75) Inventors: Yuan-Jui Lu, Taipei (TW); Kai-Shen Chen, Taipei (TW)

(73) Assignee: Solar Focus Technology Co., Ltd., Taipei (TW)

( * ) Notice: Subject to any disclaimer, the term of this patent is extended or adjusted under 35 U.S.C. 154(b) by 870 days.

(21) Appl. No.: 12/160,651

(22) PCT Filed: Apr. 26, 2006

(86) PCT No.: PCT/CN2006/000790
§ 371 (c)(1),
(2), (4) Date: Jul. 11, 2008

(87) PCT Pub. No.: WO2007/079622
PCT Pub. Date: Jul. 19, 2007

(65) Prior Publication Data
US 2008/0315828 A1    Dec. 25, 2008

(30) Foreign Application Priority Data

Jan. 13, 2006 (CN) .......................... 2006 1 0001134

(51) Int. Cl.
*H02J 7/00* (2006.01)
*H01M 10/44* (2006.01)
*H01M 10/46* (2006.01)
(52) U.S. Cl. ......... 320/101; 320/103; 320/112; 320/114
(58) Field of Classification Search .................. 320/101, 320/103, 112, 114; 307/64–65
See application file for complete search history.

(56) References Cited

U.S. PATENT DOCUMENTS

| 6,194,793 | B1 | 2/2001 | Fisher, Jr. |
| 2004/0207366 | A1* | 10/2004 | Sung .............................. 320/140 |
| 2005/0077870 | A1* | 4/2005 | Ha et al. ........................ 320/114 |

FOREIGN PATENT DOCUMENTS

| CN | 2496147 Y | 6/2002 |
| CN | 2544421 Y | 4/2003 |
| CN | 1553555 A | 6/2003 |
| CN | 2554855 Y | 6/2003 |
| CN | 1560958 A | 1/2005 |
| CN | 1560958 Y | 1/2005 |
| EP | 1557924 A2 | 1/2005 |
| FR | 2810809 A1 | 6/2006 |
| GB | 2405751 A | 9/2004 |

(Continued)

OTHER PUBLICATIONS

International Search Report corresponding to International Application No. PCT/CN06/00790 Mailed Jun. 15, 2006 (Chinese).

(Continued)

*Primary Examiner* — Samuel Berhanu
(74) *Attorney, Agent, or Firm* — Ming Chow; Sinorica, LLC

(57) ABSTRACT

The present invention discloses a multi power supply system for a portable device, particularly a power supply system having a multi power input interface and a universal serial bus (USB) power output interface and capable of receiving a solar electric power and a general battery power. The invention not only provides a multiple of power transmission interfaces of a rechargeable battery of an electric backup power source for supplying power to the portable device, but also achieves the rectification and protection effects.

4 Claims, 4 Drawing Sheets

FOREIGN PATENT DOCUMENTS

| | | |
|---|---|---|
| JP | U3105775 | 2/1990 |
| JP | 2001178017 A | 6/2001 |
| JP | U3095574 | 8/2003 |
| KR | 200363322 | 9/2004 |
| KR | 2005-34706 | 4/2005 |
| TW | 378797 Y | 12/1992 |
| TW | 266637 Y | 10/2004 |
| TW | 273123 Y | 12/2004 |
| TW | 281202 Y | 6/2005 |
| WO | WO-2005-034303 A1 | 4/2005 |

OTHER PUBLICATIONS

International Search Report corresponding to International Application No. PCT/CN06/00790 Mailed Jun. 15, 2006 (English).

\* cited by examiner

MULTI POWER SUPPLY SYSTEM FOR A PORTABLE DEVICE

BACKGROUND OF THE INVENTION

1. Field of the Invention

The present invention relates to a multi power supply system for a portable device, and more particularly to a power supply system capable of receiving an electric power of a solar module and providing a multiple of power transmission interface compatible applications for supplying power to a portable device such as a mobile phone, a personal digital assistant (PDA), a CD/MP3 walkman, a palmtop global positioning system (GPS), and a portable multimedia player (PMP), etc.

2. Description of the Related Art

As electronic technologies advance, portable electronic products such as mobile phone, personal digital assistant (PDA), CD/MP3 walkman, digital camera, palmtop global positioning system (GPS) and portable multimedia player (PMP) become increasingly diversified and popular, and these portable electronic devices require a battery used as a primary electric power source. To use a charge circuit of a built-in rechargeable battery installed in a portable electronic device for a battery charge, manufacturers generally provide an appropriate power adapter for a particular model of the portable electronic device to convert utility power into a stabilized DC power unusable by the portable electronic device.

However, the power adapter must be used in an environment where utility power is accessible, and the power adapter must be connected to a utility power socket within the charge time for charging the rechargeable battery of the electronic device. The battery charge of the portable device is limited to a specific location, but cannot be achieved anywhere. If a user has several portable devices, the user has to carry different power adapters for charging the batteries of different brands or models of different electronic devices, and such arrangement is very inconvenient.

SUMMARY OF THE INVENTION

In view of the shortcomings of the prior art, the inventor of the present invention developed a multi power supply system for a portable device, particularly a power supply system capable of receiving electric power from a solar module, and providing a multiple of power transmission interface compatible applications for supplying electric power to the power supply system of the portable device, so that users can obtain the required power source for the portable device.

Therefore, it is a primary objective of the present invention to overcome the shortcomings of the prior art by providing a multi power supply system for supplying a power source to a portable device anytime. Since the multi power supply system of the invention comprises a solar power transmission module, users can obtain a solar electric power under a bright environment. If the brightness is insufficient to supply solar electric power, then an auxiliary power source suffices the electric power supply, so that users can obtain power source for the portable device.

A secondary objective of the present invention is to provide a multi power output interface used in different models of portable devices with various power transmission interfaces. Since the multi power output interface has a data transmission interface such as a universal serial bus (USB) transmission interface with a power transmission function, therefore the data transmission interface can be used directly to supply an electric power to a portable device such as a mobile phone, a personal digital assistant (PDA), a MP3 walkman, a palmtop GPS global positioning system, a portable multimedia player (PMP) with a data transmission interface.

A further objective of the present invention is to provide a power supply system using a battery as an electric power backup, such that if the brightness is insufficient for the supply of solar electric power, a rechargeable battery installed in the auxiliary power supply unit will be used as a backup of electric power to achieve the effect of preventing a power interrupt.

Another further objective of the present invention is to provide a multi power supply system wherein the solar module distributes extra electric power to the auxiliary electric power unit and storing the electric power into the auxiliary electric power unit, and thus regardless of leveraging a bright environment that supplies solar power or using the electric power of the power supply system, the electric energy generated by the solar power unit of the power supply system can be used by the electronic device or the remaining electric power can be stored in the rechargeable battery for future use. Obviously, the present invention provides a more convenient power supply and extends the supply of a power source of the portable device to achieve the effects of energy saving and environmental protection.

DETAILED DESCRIPTION OF THE PREFERRED EMBODIMENT

The present invention is illustrated in details by the description of a preferred embodiment together with its related drawings as follows.

Figure 1:
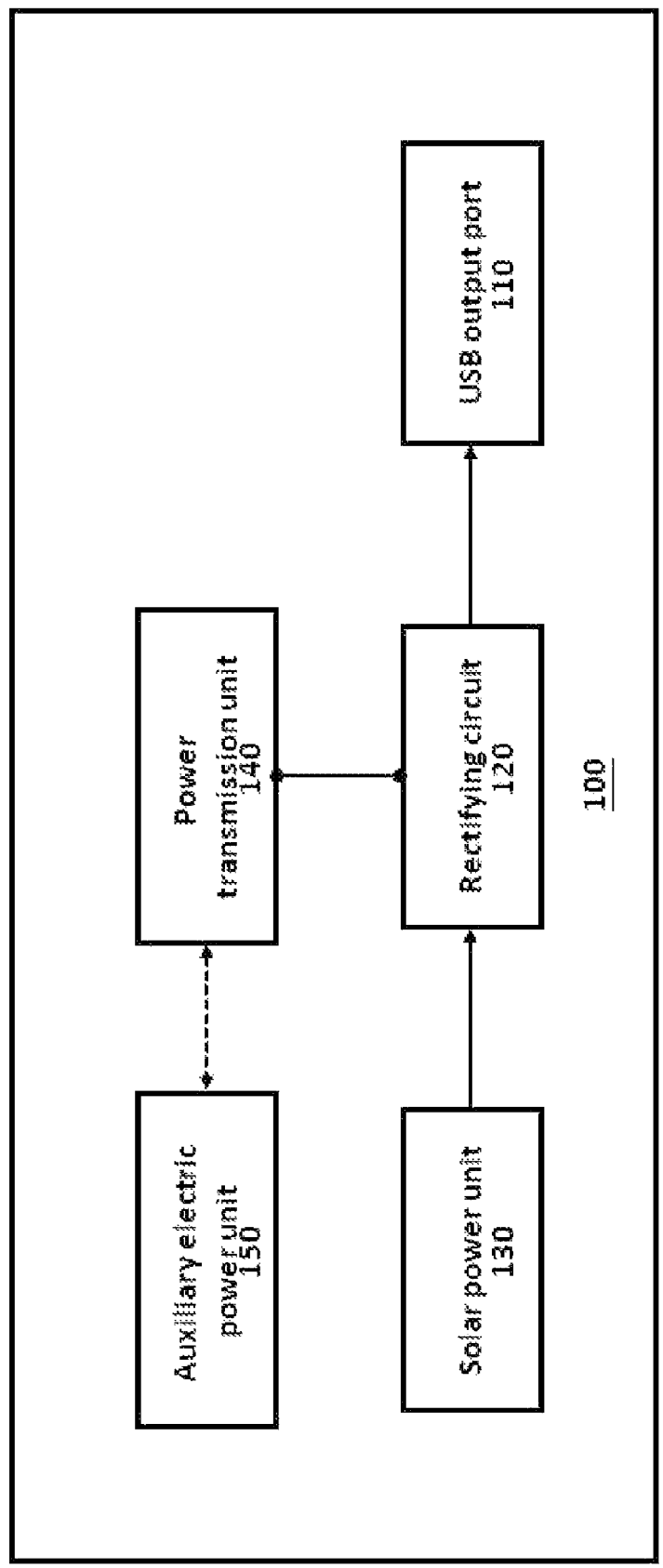
FIG. 1 is a block diagram of a multi power supply system for a portable device in accordance with the present invention.

With reference to FIG. 1 for a block diagram of a multi power supply system for a portable device in accordance with the present invention, the multi power supply system 100 comprises: a universal serial bus (USB) output port 110, which is a power output port for outputting power from the power supply system 100 to a portable device 200 through a universal serial bus (USB) compatible transmission interface; a rectifying circuit 120, for providing and integrating input and output currents of the power supply system 100, and maintaining a specific output voltage of a current outputted from the USB output port 110 to the portable device 200, and the specific output voltage can be determined by a designer; and a solar power unit 130, coupled to the rectifying circuit 120, for providing a solar/electric energy conversion unit of the power supply system 100, which is a solar cell; a power transmission unit 140, coupled to the rectifying circuit 120, for providing a current transmission unit in the power supply system 100; and an auxiliary electric power unit 150, coupled to the power transmission unit 140, for outputting electric power to the power transmission unit 140 to supply an auxiliary electric power.

However, the rectifying circuit 120 is coupled to the solar power unit 130 and the power transmission unit 140 at the same time for providing and integrating input and output currents of the power supply system 100, and also supplying a stabilized output voltage to the power supply system 100. Therefore, two different charge/discharge conditions are resulted and described as follows:

(1) If the intensity of a light received by the solar power unit 130 is too weak, such that the voltage received by the rectifying circuit 120 from the solar power unit 130 is smaller than the specific output voltage transmitted to the USB output port 110, then the electric energy of the auxiliary electric power unit 150 will be retrieved to suffice the specific output voltage. In this situation, the auxiliary electric power unit 150 can install a discharge battery such as a nickel-hydrogen battery or a lithium battery, and the power transmission unit 140 can be a discharge electrode.

(2) If intensity of a light received by the solar power unit 130 is strong enough, such that the voltage received by the rectifying circuit 120 from the solar power unit 130 is greater than the specific output voltage transmitted to the USB output port 110, then the electric energy will be distributed from the power transmission unit 140 to the auxiliary electric power unit 150 for storing electric energy. In this situation, the auxiliary electric power unit 150 can install a rechargeable battery for storing electric energy, and the power transmission unit 140 can be a charge electrode.

Figure 2:
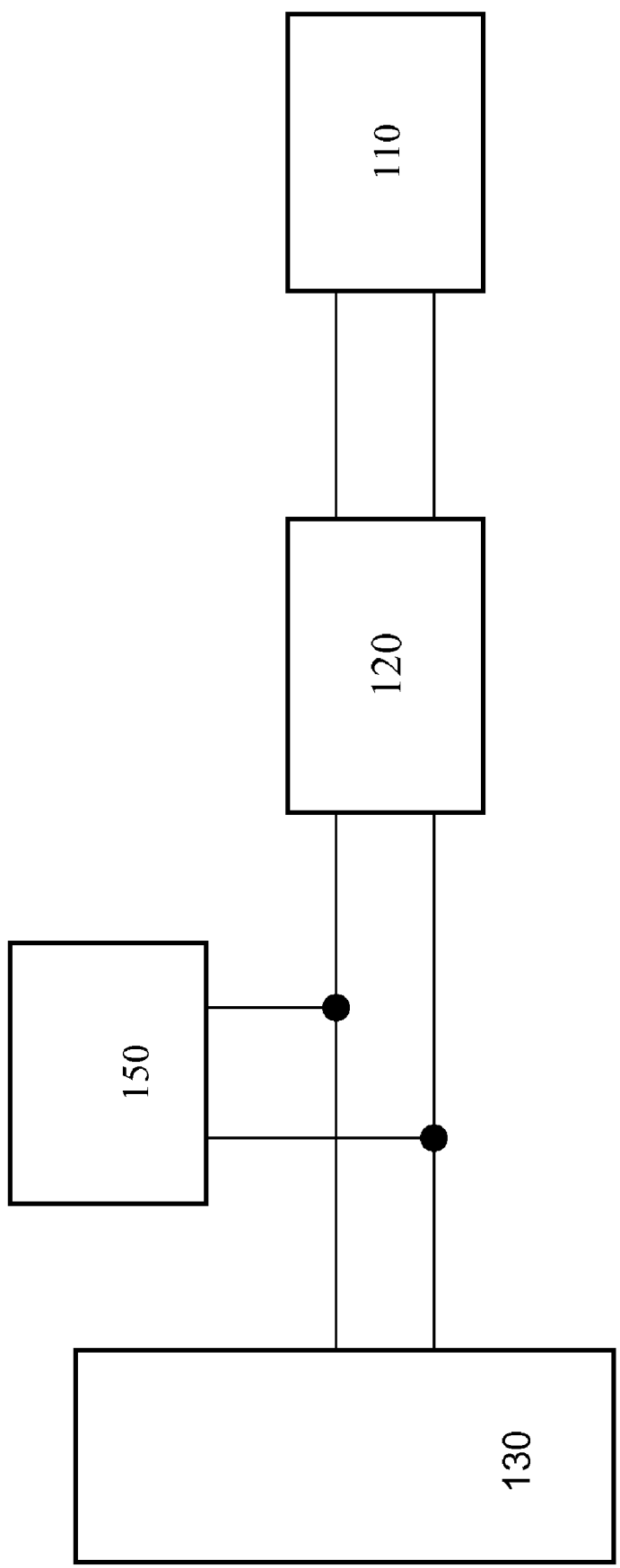
FIG. 2 is a schematic circuit block diagram of a multi power supply system for a portable device in accordance with the present invention.
Figure 3:
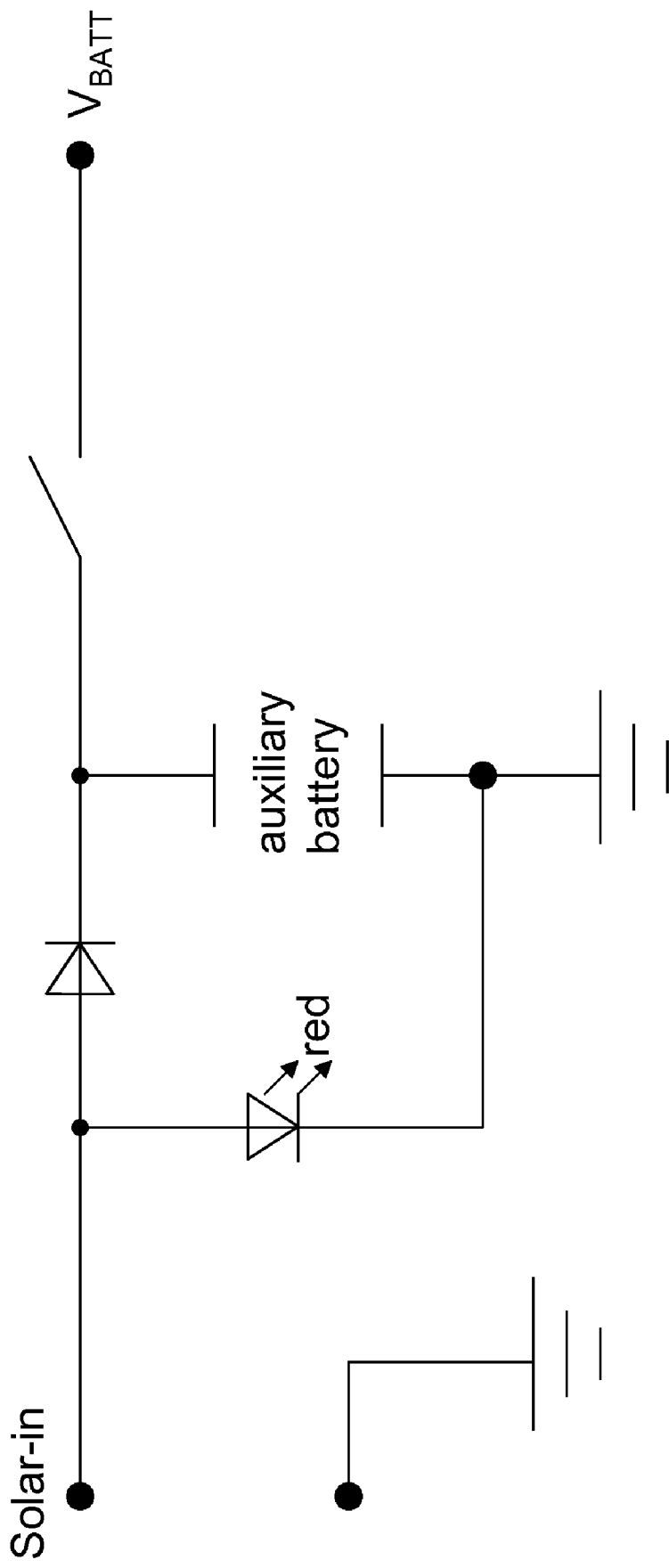
FIG. 3 is a schematic circuit diagram of a multi power supply system for a portable device in accordance with the present invention.

With reference to FIGS. 2 and 3 for a schematic circuit block diagram and a schematic circuit diagram of a multi power supply system for a portable device in accordance with the present invention respectively, a simple description of a circuit structure of a multi power supply system for a portable device in accordance with the present invention is described below. After the solar power unit 130 converts solar energy into electric energy, the rectifying circuit 120 transmits the electric energy to the USB output port 110 to output an electric power with a stable voltage to a portable device 200, and the rectifying circuit 120 is connected to the solar power unit 130 and the auxiliary electric power unit 150 at the same time for providing and integrating input and output currents of the power supply system 100, and supplying a stable output voltage to the power supply system 100. If the intensity of the light received by the solar power unit 130 is too weak, such that the voltage received by the solar power unit 130 from the rectifying circuit 120 is smaller than the specific output voltage transmitted to the USB output port 110, then the electric energy of the auxiliary electric power unit 150 will be retrieved to suffice the specific output voltage. If the intensity of the light received by the solar power unit 130 is strong enough, such that the voltage received by the rectifying circuit 120 from the solar power unit 130 is greater than the specific output voltage transmitted to the USB output port 110, the electric energy will be distributed to the auxiliary electric power unit 150 and stored in the auxiliary electric power unit 150.

Figure 4:
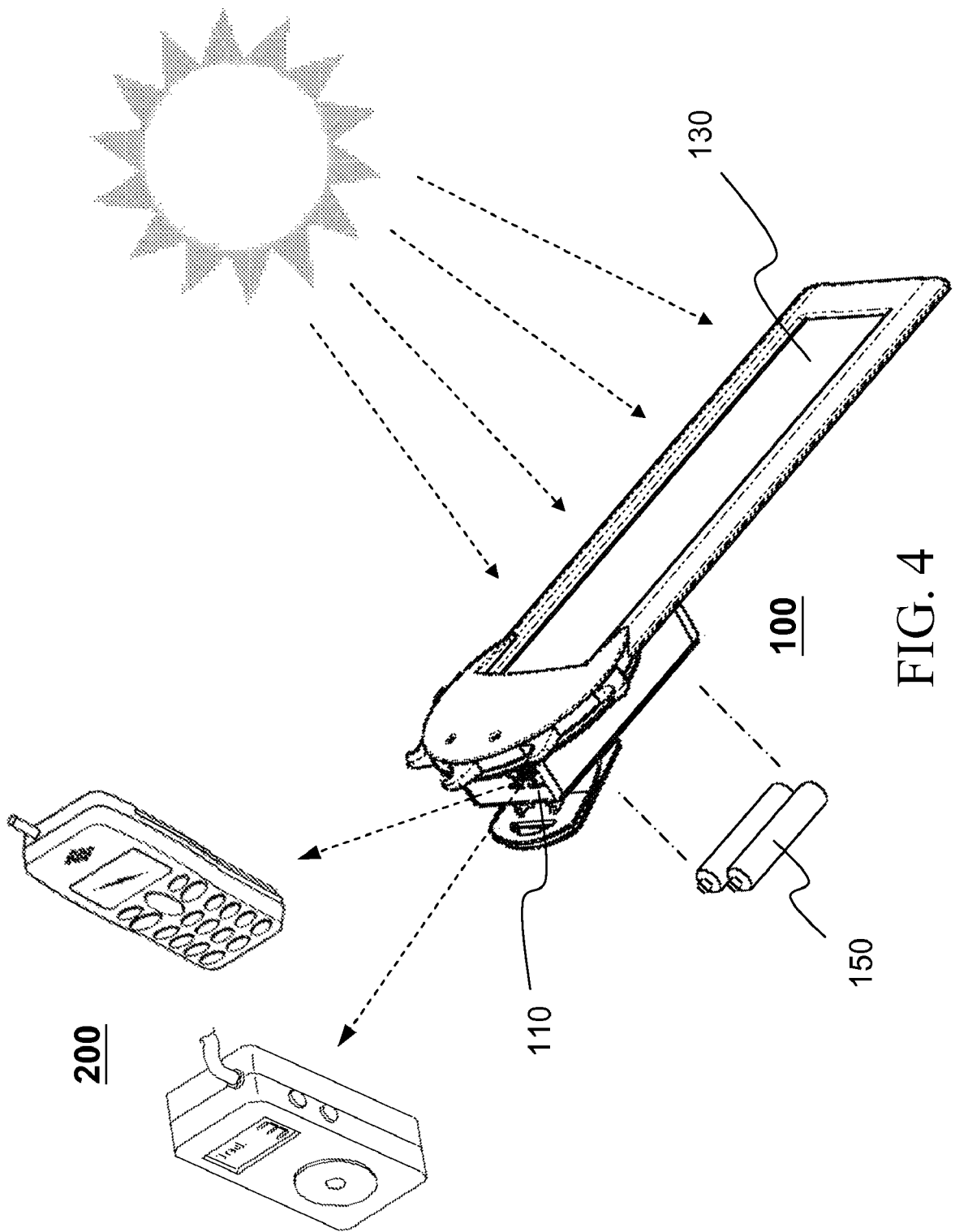
FIG. 4 is a schematic diagram of operating a multi power supply system for a portable device in accordance with the present invention.

With reference to FIG. 4 for a schematic view of operating a multi power supply system for a portable device in accordance with the present invention, the multi power supply system 100 comprises a multi power input interface, a solar power unit 130 and an auxiliary electric power unit 150, wherein a solar panel of the solar power unit 130 is provided for receiving solar energy, converting the solar energy into electric energy, and supplying a main electric power source to the power supply system 100, and the USB output port 110 outputs an electric power with a specific voltage to a portable device 200 such as a mobile phone, a personal digital assistant (PDA), a CD/MP3 walkman, a palmtop GPS global positioning system, and a portable multimedia player (PMP), etc. The invention further provides a multi power input interface, such that (1) if the intensity of the light received by the solar power unit 130 is too weak, and the voltage outputted from the USB output port 110 is smaller than the specific output voltage, then the battery of the auxiliary electric power unit 150 will supply electric power to suffice the specific output voltage; and (2) if the intensity of the light received by the solar power unit 130 is strong enough, and the voltage received from the solar power unit 130 is greater than the specific output voltage transmitted to the USB output port 110, then the electric energy will be distributed to the auxiliary electric power unit 150 and the electric power will be stored into a rechargeable battery of the auxiliary electric power unit 150.

The multi power supply system of the invention includes a multi power input interface as well as a rechargeable battery for a backup of electric power. In addition, the volume and the structure of the power supply system give a handy and portable feature suitable for users to carry the multi power supply system. Therefore, the multi power supply system of the invention is capable of obtaining solar electric energy through the solar panel anytime or using the backup of electric power provided by the rechargeable battery in a module. In the meantime, the solar energy can be used for charging and storing electric energy directly in the rechargeable battery when there is sufficient sunlight or supply of solar energy, so as to make the power supply of the portable device more convenient, and the access, storage and supply more diversified with a multiple of interface compatible applications, so as to achieve the effects of energy-saving and environmental protection.

While the invention has been described by means of specific embodiments, numerous modifications and variations could be made thereto by those skilled in the art without departing from the scope and spirit of the invention set forth in the claims.

What is claimed is:

1. A multi power supply system (100) for a portable device (200), comprising a universal serial bus (USB) output port (110), a solar power unit (130) and an auxiliary electric power unit (150), wherein the universal serial bus (USB) output port (110) is a power output port for outputting power from the multi power supply system (100) to the portable device (200); the multi power supply system (100) characterized in that:
the multi power supply system (100) further comprises a power transmission unit (140) and a rectifying circuit (120), wherein, the auxiliary electric power unit (150) is coupled to the power transmission unit the power transmission unit (140) is coupled to the rectifying circuit (120) for supplying an auxiliary electric power from the auxiliary electric power unit (150) to the rectifying circuit (120) and supplying a charging power from the rectifying circuit (120) to the auxiliary electric power unit (150);

the solar power unit (130) is coupled to the rectifying circuit (120) to provide a solar/electric energy conversion for supplying a solar electric power to the rectifying circuit (120);

the rectifying circuit (120) is directly coupled to the power transmission unit (140), the solar power unit (130) and the universal serial bus (USB) output port (110) for simultaneously providing four functions of (a) integrating the auxiliary electric power and the solar electric power;

(b) stabilizing the power received from the auxiliary electric power and the solar electric power;

(c) supplying an output current at a specific output voltage to the universal serial bus (USB) output port (110); and (d) charging the auxiliary electric power unit (150) via the power transmission unit (140) by the solar electric power.

2. The multi power supply system (100) for a portable device (200) as recited in claim 1, wherein the USB output port (110) outputs an electric power from the multi power supply system (100) to the portable device (200) through a USB compatible transmission interface.

3. The multi power supply system (100) for a portable device (200) as recited in claim 1, wherein the specific output voltage is set by a designer.

4. The multi power supply system (100) for a portable device (200) as recited in claim 1, wherein the solar power unit (130) is a solar cell.

\* \* \* \* \*